May 27, 1924.
F. NEUBAUER
MOTOR VEHICLE
Filed Jan. 7, 1922
1,495,347
3 Sheets-Sheet 1
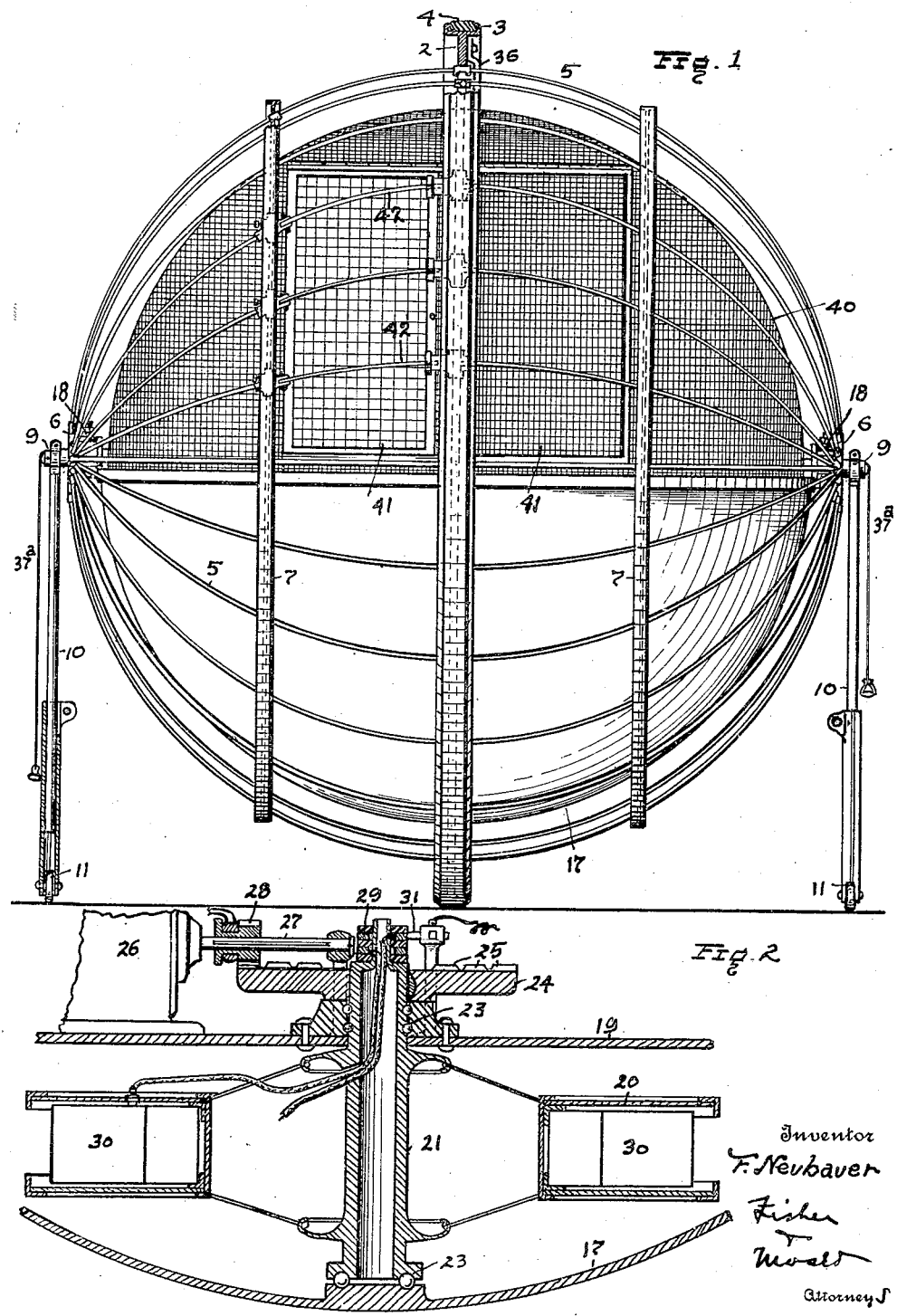

May 27, 1924.  1,495,347
F. NEUBAUER
MOTOR VEHICLE
Filed Jan. 7, 1922  3 Sheets-Sheet 2
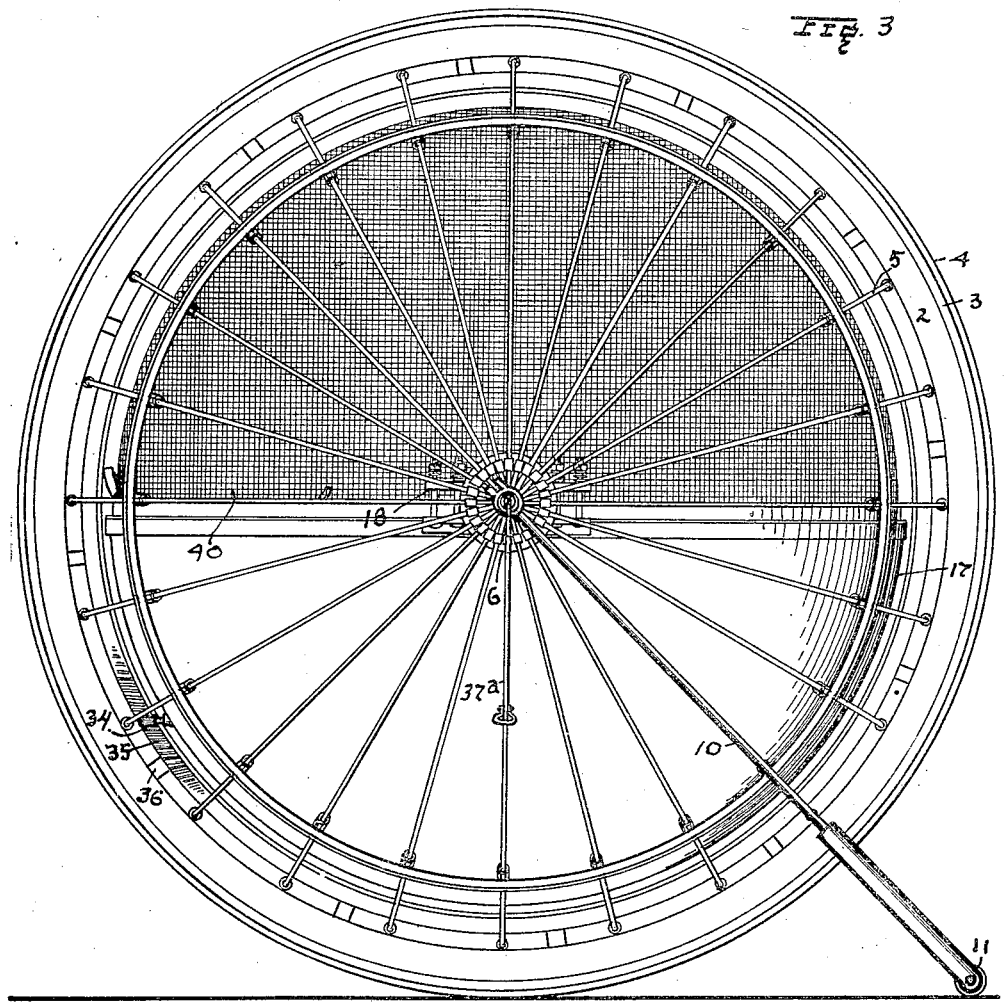
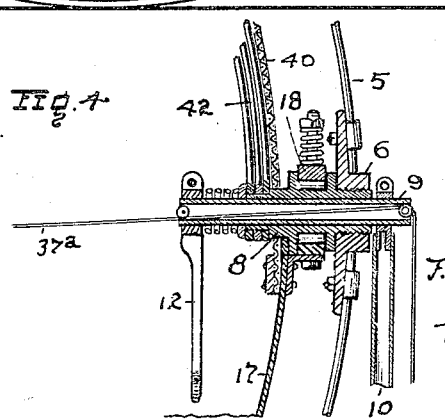

May 27, 1924.

F. NEUBAUER

MOTOR VEHICLE

Filed Jan. 7, 1922

1,495,347

3 Sheets-Sheet 3

Inventor
F. Neubauer

Attorney

Patented May 27, 1924.

1,495,347

UNITED STATES PATENT OFFICE.

FERDINAND NEUBAUER, OF CLEVELAND, OHIO.

MOTOR VEHICLE.

Application filed January 7, 1922. Serial No. 527,563.

*To all whom it may concern:*

Be it known that I, FERDINAND NEUBAUER, a citizen of the United States, residing at Cleveland, in the county of Cuyahoga and State of Ohio, have invented certain new and useful Improvements in a Motor Vehicle, of which the following is a specification.

The object of the present invention is to provide a novel self-propelled vehicle in which the operator is adapted to be supported and suspended within a globular frame adapted to function as a wheel. The propelling and controlling mechanism for this vehicle is located within this globular riding body, together with a motor and a balancing wheel which serves to stabilize the machine in running over the road. Provision is also made whereby the operation of the machine may be controlled from the outside as well as from the interior of the machine.

Figure 5:
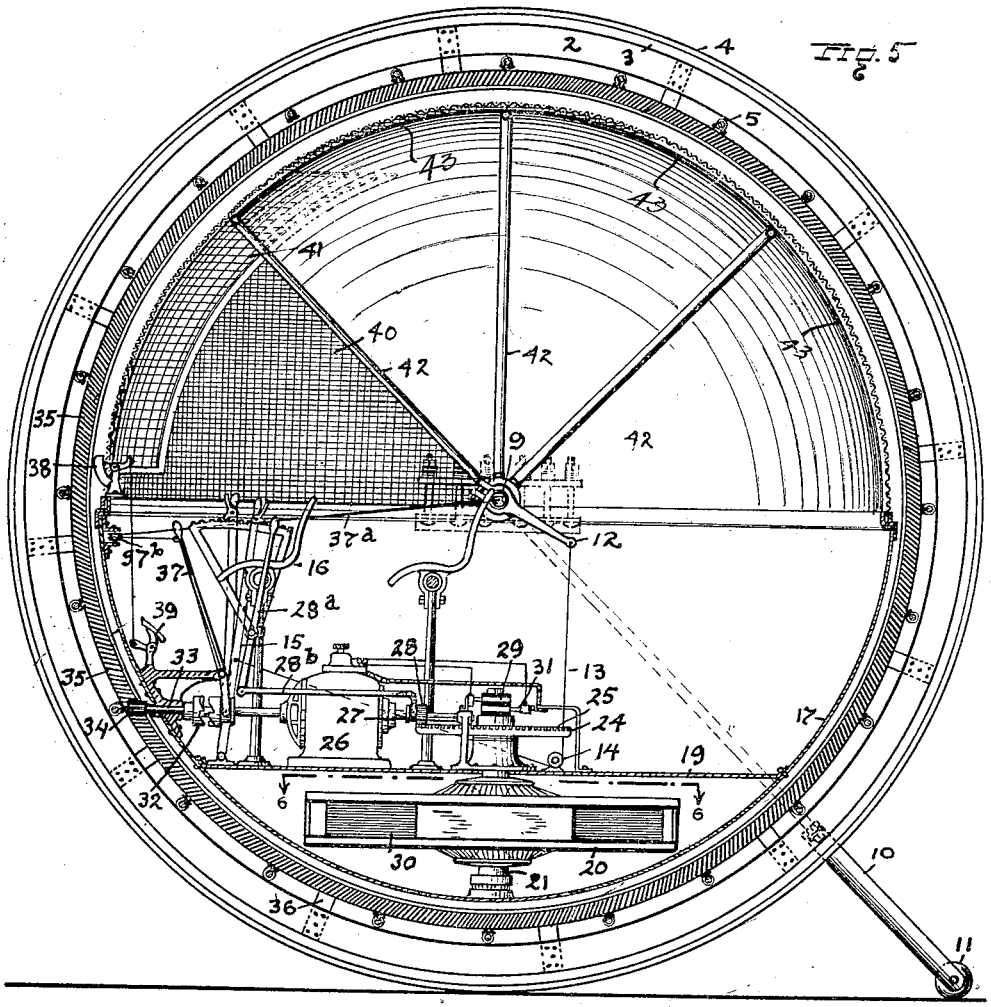
Figure 6:
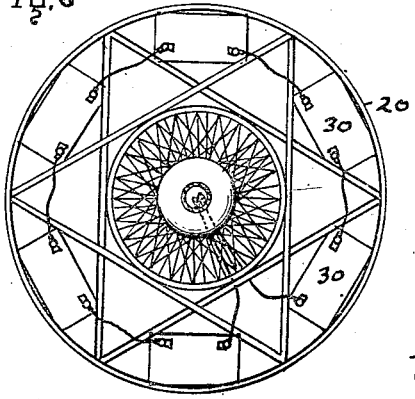

In the accompanying drawing, Fig. 1 is a front elevation of my improved vehicle and Fig. 2 is an enlarged sectional view of the balancing wheel and its operating mechanism. Fig. 3 is a side view of the vehicle and Fig. 4 an enlarged sectional view of one of the hollow axles or trunnions and associated parts of the frame. Fig. 5 is a vertical section centrally through the vehicle showing the operating mechanism and other parts within the interior of the riding body. Fig. 6 is a plan view of the combined balancing wheel and rotary battery carrier.

The vehicle comprises a single wheel in the form of an annular ring 2 having a flanged rim 3 adapted to receive and hold a riding band or solid rubber tire 4, and ring 2 is rigidly mounted upon and connected with a series of semicircular wire rods 5 or spokes for the wheel which are united at their outer ends to separate flanged hubs 6. Annular iron bands 7 rigidly connect and unite the curved spokes at each side of ring 2 and the said ring bands, spokes and hub together form a skeleton frame of substantially spherical shape. This skeleton frame is in effect a substantially spherical wheel with the axis at the center of hub 6, which comprises a short hollow sleeve 8 affixed thereto and extending inwardly toward the center of the wheel. This sleeve 8 rotates with the hub around a hollow shaft 9 which has a trailing arm 10 clamped thereto outside of the hub the lower end of the arm being tubular and adjustable and provided with a wheel or roller 11 adapted to engage and ride over the surface upon which the vehicle travels. These trailing arms are adapted to be raised and lowered alternatively to steer the vehicle, this result being obtained by rotating shaft 9 through an arm 12 and a cable 13 which runs around a sheave 14 to a controlling lever 15 located at the side of the operator's seat 16.

A metal shell or conveyor body 17 of semi-spherical shape is suspended from spring-supported bearing members 18 rotatably engaged with or swiveled upon the flanged sleeves 8 on shafts 9, see Figs. 3 and 4, and a flat floor 19 is provided within the bottom side of this shell upon which seat 16 and the operating parts are mounted. The space beneath this flat bottom is occupied by a balance wheel 20 supported upon a hollow vertical shaft 21 operating in ball or roller bearings 23, see Fig. 2, the upper end of this shaft having a disk 24 fastened to it which is provided upon its upper face with concentric circles of gear teeth 25. This gear is adapted to be driven by an electric motor 26 having an extended armature shaft 27 carrying a slidable gear 28 shifted by a lever 28$^a$ and link 28$^b$ and which is adapted to be placed in mesh with gear teeth 25 at different distances from the axis to rotate balance wheel 20 at different speeds. Electric conducting rings 29 are mounted upon the exposed end of vertical shaft, and these conducting rings are electrically connected with storage batteries 30 carried within the peripheral portion of balance wheel 20, see Figs. 2 and 6, and a motor is electrically connected to brushes 31 engaged with the conducting rings 29. The armature shaft of motor 26 extends forward and carries a sliding clutch 32 adapted to engage and operate a short drive shaft 33 having a pinion 34 meshing with a ring gear 35 attached to ring 2 by brackets 36, and a lever 37 is adapted to shift clutch 32. Cables 37$^a$ extend from lever 37 around sheaves 37$^b$ and pass through the hollow shafts 9 to the outside where they can be grasped and the lever operated to stop or start the vehicle when used as a tractor.

A brake shoe 38 is pivoted on a bracket on the upper border edge of shell 17 opposite the inner edge of gear 35, and this brake shoe 38 is adapted to be operated by a pivoted foot pedal 39 in front of seat 16, see Fig. 5. The upper half of shell 17 is enclosed by a wire mesh cover 40 having sliding or hinged doors 41 in its front side and a number of the spokes 5 are made with hinged short sections 42 to permit entrance into the interior through the doors 41 when opened. The upper side of the body or shell 17 is also adapted to be closed or covered by folding top sections 43 journaled on sleeve 8 inside of the wire mesh cover 40, see Fig. 5, and shell 17 is water-tight at all points and capable of displacing sufficient water to float the vehicle if occasion demands travel through or upon a body of water. In this event, the spokes of the skeleton frame will serve as propellers, especially if made flat or provided with propelling blades or surfaces.

What I claim, is:

1. A motor-vehicle, comprising a skeleton frame of spherical formation having an annular traction rim upon its outside and hubs on opposite sides thereof, a shell within said frame suspended from said hubs, steering members extending through said hubs, and power devices mounted within said shell in driving connection with said frame.

2. A motor-vehicle, comprising a skeleton frame having hubs, a spherical body within said frame rotatably journaled upon said hubs, a motor within said body in driving connection with said frame, and a balance wheel mounted in a vertical axis within the lower part of said vehicle in operating connection with said motor.

3. A motor vehicle, comprising a spherical wheel having hollow axes, a body having bearings supported in spring suspension from said axes, guiding devices at each side of said wheel rotatably supported within said axes, and controlling means within said body for guiding devices.

4. A motor vehicle, comprising a skeleton frame of spherical form having a central rim and tire and hollow hubs, a semi-spherical shell having spring-supported bearings engaged with said hubs, a hollow shaft extending through each hub having adjustable guiding arms outside of said wheel, and controlling means for said shafts within said body.

5. A motor vehicle, comprising a spherical skeleton wheel, having axle portions, a spherical shell suspended within said wheel upon said axle portions, and folding top sections for said shell journaled upon said axle portions.

FERDINAND NEUBAUER.